(12) United States Patent
Oukassi et al.

(10) Patent No.: US 9,882,201 B2
(45) Date of Patent: Jan. 30, 2018

(54) ELECTROCHEMICAL DEVICE, SUCH AS A MICROBATTERY OR AN ELECTROCHROMIC SYSTEM, AND FABRICATION METHOD THEREOF

(71) Applicant: COMMISSARIAT À L'ENERGIE ATOMIQUE ET AUX ENERGIES ALTERNATIVES, Paris (FR)

(72) Inventors: Sami Oukassi, Saint-Egrève (FR); Steve Martin, Saint-Sauveur (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 83 days.

(21) Appl. No.: 14/920,409

(22) Filed: Oct. 22, 2015

(65) Prior Publication Data

US 2016/0118645 A1 Apr. 28, 2016

(30) Foreign Application Priority Data

Oct. 22, 2014 (FR) ...................................... 14 60154

(51) Int. Cl.
*H01M 4/134* (2010.01)
*H01M 4/04* (2006.01)
(Continued)

(52) U.S. Cl.
CPC ............ *H01M 4/134* (2013.01); *G02F 1/155* (2013.01); *G02F 1/1525* (2013.01);
(Continued)

(58) Field of Classification Search
CPC ........................... H01M 4/0404; H01M 4/134
See application file for complete search history.

(56) References Cited

U.S. PATENT DOCUMENTS 6,818,356 B1 11/2004 Bates
8,420,252 B2 4/2013 Shakespeare et al.
(Continued)

FOREIGN PATENT DOCUMENTS

| EP | 2192638 A1 | 6/2010 |
|----|------------|--------|
| EP | 2432065 A1 | 3/2012 |
| FR | 2874128 A1 | 2/2006 |

OTHER PUBLICATIONS

Son et al., "Effect of cathode/anode area ratio on electrochemical performance of lithium-ion batteries," Journal of Power Sources, vol. 243, 2013, pp. 641-647.

*Primary Examiner* — Olatunji Godo
(74) *Attorney, Agent, or Firm* — Oliff PLC

(57) ABSTRACT

An electrochemical device including a stack of solid thin layers formed on a substrate, the stack successively including, a first current collector covering a part of the substrate, first electrode defining a pattern having bottom surface, top surface and side walls, the bottom surface of the pattern covering at least part of the first current collector, electrolyte layer configured to cover at least the top surface and at least part of the side walls of the pattern of the first electrode, a second electrode totally covering the electrolyte layer, the thickness of the electrolyte layer arranged between the walls of the pattern of first electrode and the second electrode being substantially equal around the pattern to within 20%, a second current collector totally covering the second electrode, the second current collector and the second electrode being electrically insulated from the first current collector and from the first electrode.

13 Claims, 3 Drawing Sheets

(51) Int. Cl.
*H01M 10/052* (2010.01)
*H01M 10/0585* (2010.01)
*H01M 6/40* (2006.01)
*G02F 1/155* (2006.01)
*H01M 4/1395* (2010.01)
*H01M 4/70* (2006.01)
*H01M 10/04* (2006.01)
*H01M 10/0525* (2010.01)
*G02F 1/15* (2006.01)
*G02F 1/153* (2006.01)
*H01M 10/0562* (2010.01)
*H01M 4/38* (2006.01)

(52) U.S. Cl.
CPC ....... *H01M 4/0404* (2013.01); *H01M 4/0421* (2013.01); *H01M 4/1395* (2013.01); *H01M 4/70* (2013.01); *H01M 6/40* (2013.01); *H01M 10/0436* (2013.01); *H01M 10/052* (2013.01); *H01M 10/0525* (2013.01); *H01M 10/0585* (2013.01); *G02F 1/153* (2013.01); *H01M 4/382* (2013.01); *H01M 10/0562* (2013.01)

(56) References Cited

U.S. PATENT DOCUMENTS

| | | |
|---|---|---|
| 8,815,450 B1 | 8/2014 | Bates |
| 2010/0330411 A1 | 12/2010 | Nam et al. |
| 2013/0280581 A1 | 10/2013 | Sun et al. |
| 2014/0106203 A1 | 4/2014 | Shih et al. |

ELECTROCHEMICAL DEVICE, SUCH AS A MICROBATTERY OR AN ELECTROCHROMIC SYSTEM, AND FABRICATION METHOD THEREOF

BACKGROUND OF THE INVENTION

The invention relates to an electrochemical device, such as a microbattery or an electrochromic system, and to its fabrication method.

STATE OF THE ART

Microbatteries are defined as being all-solid electrochemical generators formed by an active stack of thin layers which form the electrodes (positive and negative) separated by an electrolyte.

The positive electrode is formed from a material having a good ionic conductivity, for example titanium oxysulfide (TiOS) or a lithiated metal oxide, such as $LiCoO_2$, $LiNiO_2$, $LiMn_2O_4$.

The electrolyte is an electric insulator having a high ionic conductivity such as lithium and phosphorus oxynitride (LiPON), LiPON, LiBON, $Li_2SO_4$, $LiNbO_3$ . . . .

The negative electrode is formed by metallic lithium or by a lithiated material.

The microbatteries further comprise metallic current collectors, for example made from platinum or tungsten.

All the layers of the microbattery are in the form of thin films obtained by Physical Vapor Deposition (PVD) or Chemical Vapor Deposition (CVD). The total thickness of the stack with the encapsulation layers is about 15 µm.

The operating principle is based on insertion-extraction (or intercalation-deinsertion) of cations, generally $Li^+$, in the host structure (insertion or conversion material, alloy, etc).

The cycling stability performances of a microbattery require an excellent reversibility of the $X^+$ ionic insertion. These performances depend on several parameters:
- selection of the host materials (nature of the positive and negative electrodes) and of the electrolyte,
- the electrochemical equilibrium (capacities, dopings and thicknesses of the electrodes),
- the architecture of the microbattery (positioning and overlap of the electrodes) and the ratio between the surface of the positive electrode and the surface of the negative electrode.

Three major microbattery architecture configurations are described in the prior art.

In the first configuration, one of the surfaces (areas) of the electrodes is larger than the other.

The article by Son et al. (Journal of Power Sources 243 (2013) 641-647) recommends the use of a Li-ion battery with an anode having a surface larger than or equal to that of the cathode in order to increase the lifespan of the battery.

Such a configuration is also described in the document EP 2 192 638, or again in the document U.S. Pat. No. 6,818,356 which shows a substrate 44 successively covered by a cathode 50, an electrolyte layer 42 and an anode 52. The electrolyte layer 42 covers the side walls and the top surface of the cathode 50. The anode 52 is deposited above the electrolyte layer 42. The anode 52 partially covers the electrolyte layer 42. Each electrode 50, 52 is connected to a current collector 46, 48.

The anode is positioned above the architecture of the microbattery and presents a larger surface than the surface of the cathode.

FIG. 1 schematically represents such a configuration.

The document US 2014/0106203 also describes a lithium battery presenting such an architecture. To improve the performances of the battery, this document further recommends that the anode does not totally cover the cathode, which enables short-circuiting between the anode and cathode to be reduced or even eliminated, and the charging capacity of the battery to be improved. The length of the non-overlap is at least 10 µm. Such a configuration is simple to implement.

In a second configuration, and as represented schematically in FIG. 2, the surfaces of the electrodes 104, 106 are identical and the surfaces are facing one another, arranged parallel to the substrate 102. Each electrode 104, 106 is connected to a current collector 110, 112. The flanks of the electrolyte layer 108 are not covered by the electrodes 104, 106. A portion of the current collector 112 of the electrode, located at the top of the stack, covers the flank of the electrolyte. The document US 2010/0330411 describes this architecture. However, such an architecture does not present a satisfactory lifespan.

In a third configuration presented schematically in FIG. 3, the stack deposited on the substrate 220 comprises two electrodes 226, 236 connected to current collectors 224, 230; the surface of the electrodes is identical and a dielectric material 242 is arranged on the sides of the battery to insulate the electrolyte 238 from the current collector 230 of the electrode located above the electrolyte. The document U.S. Pat. No. 8,420,252 describes a microbattery structure according to this configuration.

However, such a configuration is more complex to implement and the lifespan of these devices is not satisfactory either.

This problem is also encountered in electrochromic systems. Electrochromic, or electrochromatic, devices are devices which change colour due to the action of a electric field.

The devices present a similar architecture to microbatteries: they comprise an active electrode and a counter-electrode separated by an electrolyte. The active electrode is conventionally composed of an electrochromatic material that is able to reversibly and simultaneously insert ions and electrons.

Insertion of the ions has to be reversible in order to obtain devices presenting a good stability when cycling operations are performed.

OBJECT OF THE INVENTION

The object of the invention is to remedy the shortcomings of the prior art, and in particular to propose an electrochemical device presenting a good cycling stability.

This objective is achieved by an electrochemical device, such as a microbattery, or an electrochromic system, comprising a stack of solid thin layers formed on a substrate, said stack successively comprising:
- a first current collector covering a part of the substrate,
- a first electrode defining a pattern having a bottom surface, a top surface and side walls, the bottom surface of the pattern covering at least a part of the first current collector,
- an electrolyte layer configured to cover at least the top surface and at least a part of the side walls of the pattern of the first electrode,
- a second electrode totally covering the electrolyte layer, the thickness of the electrolyte layer arranged between the walls of the pattern of the first electrode and the second electrode being substantially equal around said pattern to within 20%,
a second current collector totally covering the second electrode, the second current collector and the second electrode being electrically insulated from the first current collector and from the first electrode,
said device comprising first and second electric connection means respectively connected to the first and second current collectors and insulated from one another.

This object is also achieved by a fabrication method of an electrochemical device comprising the following successive steps:
providing a substrate covered by a first current collector,
forming a first electrode on the first current collector, the first electrode defining a pattern having a bottom surface, a top surface and side walls, the bottom surface of the pattern covering at least a part of the first current collector,
forming an electrolyte layer on the first electrode, the electrolyte layer being configured to cover at least the top surface and at least a part of the side walls of the pattern of the first electrode,
forming a second electrode totally covering the electrolyte layer, the thickness of the electrolyte layer arranged between the walls of the pattern of the first electrode and the second electrode being substantially equal around said pattern to within 20%,
forming a second current collector totally covering the second electrode, the second current collector and the second electrode being electrically insulated from the first current collector and from the first electrode,
forming first and second electric connection means respectively connected to the first and second current collectors and insulated from one another.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF A PREFERRED EMBODIMENT OF THE INVENTION

Figure 4:
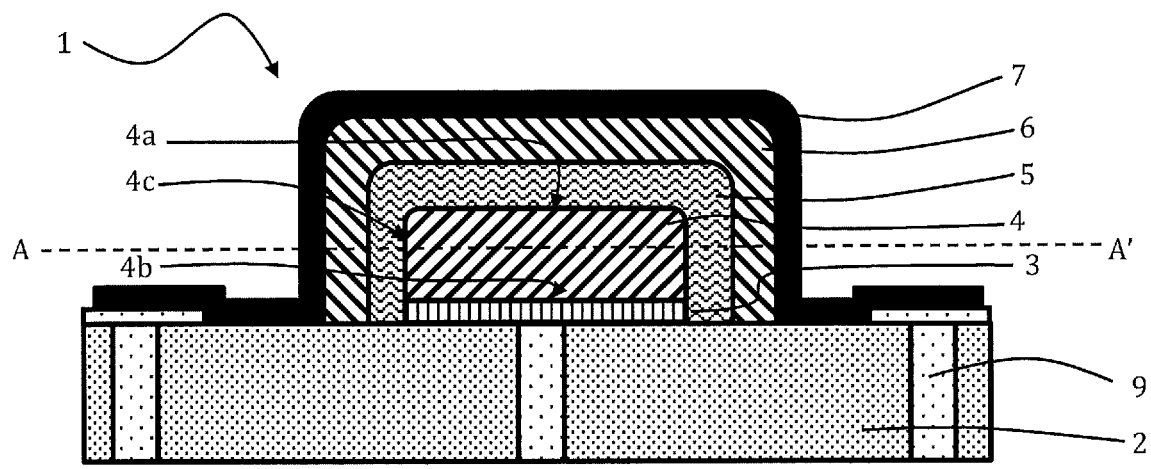
FIG. 4 and FIGS. 7 to 9 represent an electrochemical device according to different embodiments of the invention, in schematic manner, in cross-section.

As illustrated in FIG. 4, the electrochemical device 1, such as a microbattery or an electrochromic system, comprises a stack of solid thin layers formed on a substrate 2. In a particularly advantageous embodiment, the substrate is electrically insulating or comprises an electrically insulating layer on its surface. The substrate 2 is provided with a first surface and a second surface. The stack is deposited on the first surface of the substrate 2, i.e. on the electrically insulating layer.
The stack successively comprises:
a first current collector 3, covering a part of the substrate 2,
a first electrode 4 defining a pattern having a bottom surface, a top surface and side walls, the bottom surface of the pattern covering at least a part of the first current collector 3,
an electrolyte layer 5 configured to cover at least the top surface and at least a part of the side walls of the pattern of the first electrode 4,
a second electrode 6 totally covering the electrolyte layer 5,
a second current collector 7 at least partially covering the second electrode 6.

What is meant by at least a part is that the electrolyte layer covers at least a part of each of the side walls of the pattern of the first electrode 4.

In a particular embodiment, the electrolyte layer 5 completely covers the side walls of the pattern of the first electrode 4.

According to a particular embodiment, the thickness of the electrolyte layer 5 disposed between the side walls of the pattern of the first electrode 4 and the second electrode 6 is substantially equal around said pattern to within 20%. The thickness of the electrolyte layer 5 does not vary by more than 20% all around the pattern.

What is meant by all around the pattern is around the side walls of the pattern: the electrolyte layer does not vary by more than 20% between the side walls of the pattern of the first electrode and the second electrode 6.

The thickness of the electrolyte layer 5 corresponds to the minimum distance between the first and second electrodes 4 and 6, i.e. between the two opposite surfaces of the electrolyte.

Advantageously, the thickness of the electrolyte layer 5 does not vary by more than 20% both between the side walls of the pattern of the first electrode and the second electrode 6 but also between the top surface of the pattern and the second electrode 6. For example, the thickness of the electrolyte layer 5 at the level of the side walls of the pattern of the first electrode does not vary by more than 20% with respect to the thickness of the electrolyte layer at the level of the top surface of said pattern.

This substantially constant distance between the first electrode 4 and the second electrode 6 makes it possible to have a uniformity of electrochemical behaviour: the thicknesses of the top surface and of the lateral surfaces of the electrolyte layer 5 being substantially the same, diffusion takes place in uniform manner.

Preferentially, the thickness of the electrolyte layer 5 does not vary by more than 10%.

The covering of the walls of the first pattern by the electrolyte layer 5 is advantageously symmetrical all around the pattern. The electrochemical fluxes are advantageously distributed in homogenous manner all around the pattern.

What is meant by symmetrical all around the pattern is that the thickness of the electrolyte layer 5, measured in a plane parallel to the first surface of the substrate 2, is substantially equal at all points.

Preferentially, the electrolyte layer 5 and the first current collector 3 totally encapsulate the pattern of the first electrode 4: the top surface 4a and lateral surfaces 4c of the first electrode 4 are totally covered by the electrolyte layer 5 and there is contact between the electrolyte layer 5 and the first electrode 4. What is meant by there is contact is that there is no intermediate layer between the electrolyte layer and the first electrode. Preferentially, the contact is continuous between the layers.

The electrolyte layer 5 covers not only the top surface 4a but also all the lateral surfaces 4c of the first electrode. If the pattern defined by the first electrode presents four lateral surfaces, the four lateral surfaces are covered and in contact with the electrolyte layer 5.

The bottom surface 4b of the first electrode is in contact with the first current collector 3. It is not in contact with the electrolyte layer 5. What is meant by bottom surface or inner surface is the surface of the layer which is located towards the bottom of the stack, i.e. towards the substrate. The top surface or outer surface corresponds to the opposite surface.

This configuration is particularly advantageous as the whole of the outer surface of the electrolyte layer 5 is in contact with the second electrode and the whole of the outer surface of the first electrode 4 is in contact with the electrolyte. In comparison with the previous configurations, all the available surfaces participate in the electrochemical exchanges.

For example, in the configurations of the prior art where a non-overlapping area of the electrolyte exists, there is no circulation of ions at the level of this non-overlapping area. The non-overlapping area can be the site of irreversible insertions in the case where the ions manage to be inserted close to the limit of the overlapping area but continue to diffuse into the electrode, and move away from this area to finally no longer be possible to de-insert. The electrochemical performances are then reduced.

This absence of flow of the ions may lead to a non-uniformity of behaviour and to formation of mechanical stresses between the covered areas and the non-covered areas of the cathode. The mechanical stresses created can induce a morphological degradation (loss of adhesion, interruption of electronic contact, or delamination of the complete stack) which can progressively transform into an electrical degradation as cycling is performed.

It has been discovered that in the configurations where the second current collector is directly in contact with the electrolyte, an electrode/electrolyte/current collector battery (commonly called Li-free battery) is formed and disturbs operation of the main electrode/electrolyte/electrode battery during cycling. This parasite operation is detrimental to satisfactory operation of the battery.

It has also been discovered that deposition of a dielectric layer arranged in contact with the electrolyte and the current collector and between these two elements can impair the interfaces between the different thin layers of the stack and the materials of the battery.

Furthermore, the presence of a dielectric layer in this type of architecture cancels any exchange of ions at the level of the flanks of the structure, resulting in a loss of active surface of the battery. Deposition of the dielectric layer on the flank can impair the interfaces/materials of the battery and reduce the lifespan of the devices.

Figure 7:
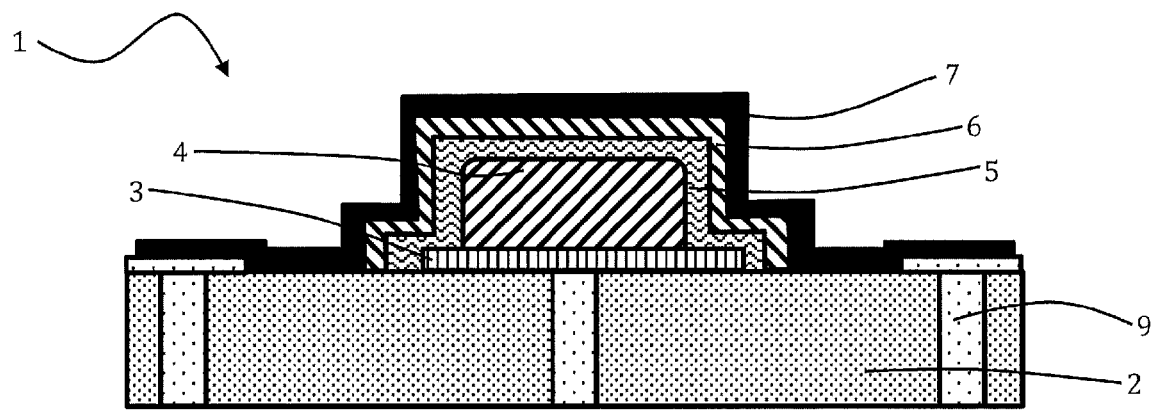
Figure 8:
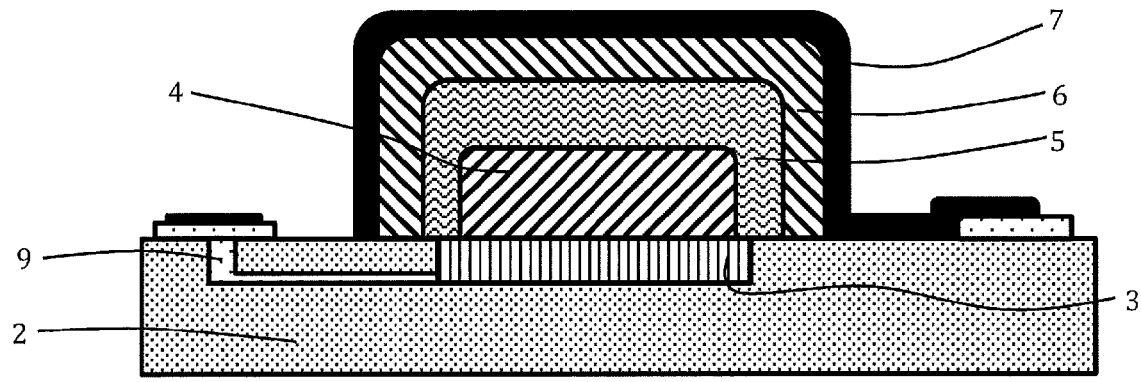

On the other hand, in the embodiments illustrated in FIGS. 4, 7 and 8, as the whole of the outer surface of the first electrode 4 is covered by the electrolyte, the ion flux and the potential are more homogenous at all points of the surface of the first electrode 4. The uniformity of the ion exchanges enables the mechanical stresses to be limited and/or enables the host structure of the first electrode 4 and of the second electrode 6 to be solicited in more uniform manner, which has the consequence of minimising the localised variations of the mechanical, chemical, and electrochemical properties (respectively, for example, delamination, irreversible excess lithiation, overvoltage). The device presents a good stability in cycling. It has been observed that the lifespan of such a device is increased.

Furthermore, as the side walls or flanks of the first electrode 4 also participate in the electrochemical reactions, the capacities of the device are improved. It is then possible to achieve a more compact device with enhanced performances.

The electrolyte layer 5 is in contact with the first current collector 3 and is configured to electrically insulate said first current collector 3 from the second electrode 6.

Advantageously, the electrolyte layer 5 completely covers the first electrode 4 and the first current collector 3 to come into contact with the substrate. The periphery of the electrolyte layer 5 is in continuous contact with the substrate 2. What is meant by continuous contact is that the periphery of the electrolyte layer 5 is continually in contact with the substrate 2: there is no element separating the substrate and the periphery of the electrolyte layer.

Continuous connection of the electrolyte 5 with the substrate enables the first current collector and the first electrode 4 between the substrate 2 and the electrolyte 5 to be completely encapsulated, and to insulate them from the outside environment.

A similar structure is present with the second electrode 6 which totally covers the outer surface of the electrolyte 5, i.e. the side walls and the top surface of the electrolyte layer 5 and there is contact between the second electrode 6 and the electrolyte 5.

The periphery of the second electrode 6 is in continuous contact with the substrate 2, encapsulating, insulating, and protecting the electrolyte 5 and first electrode 6 from the outside environment.

Advantageously, covering of the second electrode 6 by more than 90% enables the electric charges to be better distributed and collected. Preferentially, a complete covering (100%) of the second electrode 6 further enables it to be protected from the outside environment. Total covering of the second electrode 6 enables a better uniformity of the ion flux during cycling of the battery. The electric performances are improved, and the risks of mechanical failure are reduced as there is no longer any difference of behaviour between the covered areas and the uncovered areas.

Figure 1:
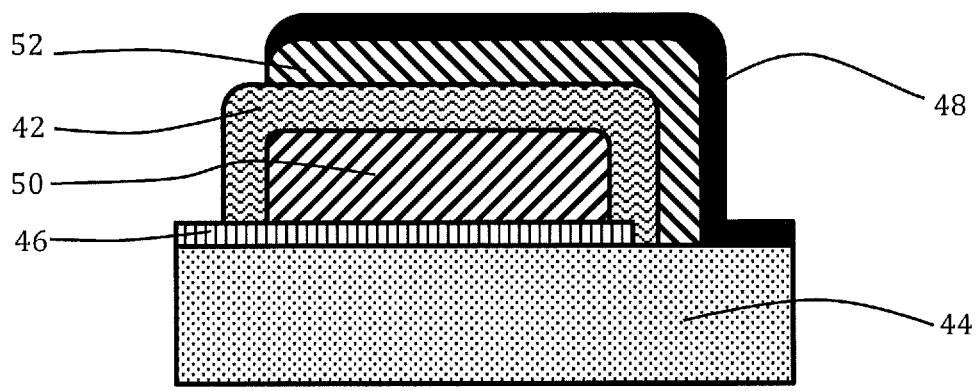
FIGS. 1 to 3 represent an electrochemical device according to the prior art, in schematic manner, in cross-section.

For comparison purposes, the configuration presented in FIG. 1 does not enable uniformity of the ion flux to be ensured. An accumulation of the ions then exists in localised manner which results in creation of mechanical stresses. The reversibility of such an architecture is impaired.

Figure 2:
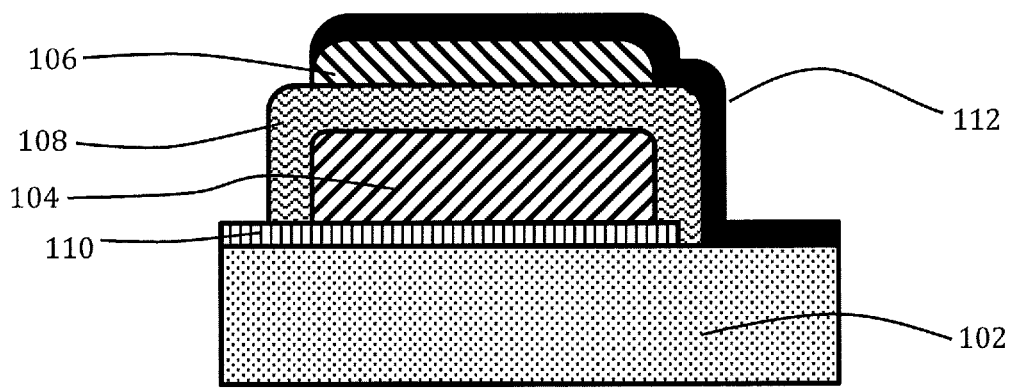

The configuration presented in FIG. 2 does not enable uniformity of the ion flux to be ensured. This architecture moreover also presents a non-uniformity of potential. An accumulation of the ions then exists in localised manner which results in creation of mechanical stresses. The reversibility of such an architecture is impaired.

Figure 3:
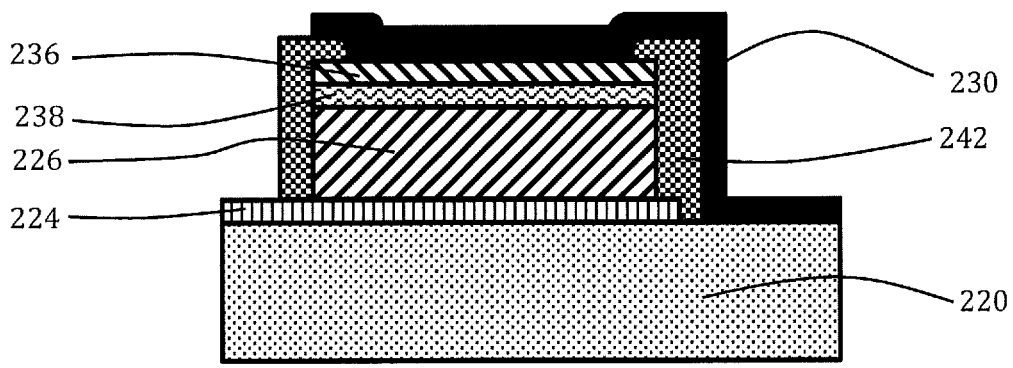

The configuration presented in FIG. 3 enables a better uniformity of the ion flux than the previous two architectures. However, this architecture is not very efficient as a large part of the surface is lost mainly at the level of the flanks.

The second electrode 6 is electrically separated from the first electrode 4 by the electrolyte layer 5, which prevents short-circuiting.

The first electrode 4 presents a bottom surface which at least partially covers the first current collector 3 which enables different configurations to be achieved.

In an embodiment illustrated in FIG. 7, the first electrode 4 presents a bottom surface which partially covers the first current collector 3. Advantageously, the pattern formed by the first electrode 4 defines a continuous peripheral guard ring all around the first electrode 4 on the top surface of the first current collector 3. In this embodiment, the electrolyte layer 5 totally covers the top surface of the first electrode 4, the lateral surfaces of the first electrode 4, the lateral surfaces of the first current collector 3 and the peripheral guard ring. The electrolyte layer 5 is in contact with the first electrode 4 and the first current collector 3. The electrolyte layer 5 totally encapsulates the first electrode 4 and presses on the first current collector 3.

In this particular case, the first electrode 4 is not in contact with the substrate 2.

In advantageous manner, the guard ring presents a constant width materialised by a constant distance between the lateral surface of the first electrode 4 and the lateral surface of the first current collector 3.

As a variant, covering of the top surface of the first current collector 3 by the first electrode can be partial but without definition of a continuous peripheral guard ring, i.e. the first collector 3 has at least one lateral surface in the extension of a lateral surface of the first electrode 4 and/or the first electrode 4 overspills beyond the pattern formed by the first current collector 3.

In another embodiment as represented in FIG. 4, covering of the top surface of the first current collector 3 by the first electrode 4 is complete but without the first electrode 4 overspilling beyond the first current collector 3. In other words, the side walls of the first current collector 3 are each in the extension of the side walls of the first electrode 4. This configuration enables the surfaces of the substrate to be used to the maximum.

In this particular case, there is an interface between the electrolyte 5 and the first current collector 3 only on the lateral surfaces of the first current collector 3.

In another alternative embodiment that is not represented, covering of the top surface of the first current collector 3 by the first electrode 4 is complete and the first electrode 4 overspills beyond the pattern formed by the first current collector 3 without however forming a protection all around the first current collector 3. In this particular case, there is an interface between the electrolyte 5 and the first current collector 3.

In yet another embodiment that is not represented, covering of the top surface of the first current collector 3 by the first electrode 4 is complete and the first electrode 4 overspills beyond the first current collector 3 so as to prevent any contact between the first current collector 3 and the electrolyte 5. The first current collector 3 is separated from the electrolyte 5 by the first electrode 4.

In another alternative embodiment illustrated in FIG. 8, the first current collector 3 is buried in the substrate and preferably in the electrically insulating layer so that at least a part of the lateral surfaces of the first current collector 3 is covered by the electrically insulating layer. As in the previous embodiments, the electrolyte layer 5 is deposited so as to completely cover the first electrode 4 and what is left uncovered of the first current collector 3, for example the guard ring. Advantageously, the electrolyte layer 5 also overspills onto the substrate to provide the electric insulation between the first and second electrodes.

Advantageously, the contacts are buried in the substrate and protected during the steps of the fabrication method. They are for example protected from possible oxidisation when heat treatment or chemical treatment is performed.

Figure 5:
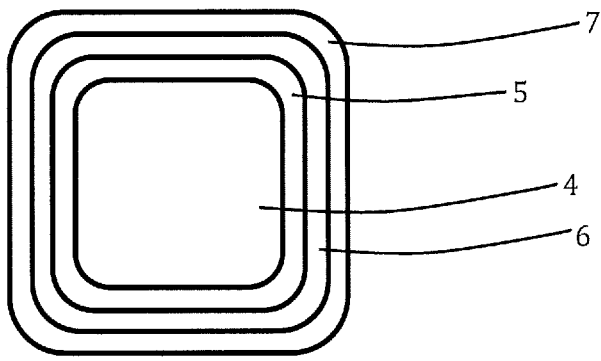
FIGS. 5 and 6 represent two electrodes and an electrolyte layer according to different embodiments of the invention, schematically, in top view.
Figure 6:
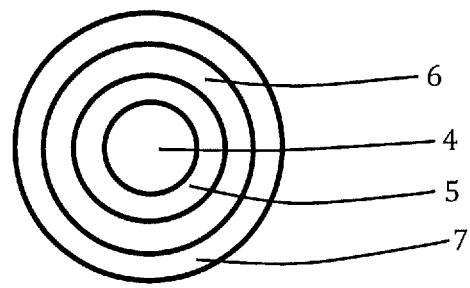

The pattern defined by the first electrode 4 can be of any shape, for example a cylinder, a cube or a slab. Advantageously, and as represented in FIGS. 5 and 6, the first electrode 4, electrolyte layer 5 and second electrode 6 present the same shape in top view. The top view is obtained along the axis AA' of FIG. 4.

In advantageous manner, the initial shape of the first electrode 4 is kept when deposition of the electrolyte layer 5 is performed and preferentially when deposition of the second electrode 6 is performed. This preservation of the initial shape enables the differences of thicknesses between the surfaces to be limited which facilitates the preservation of homogenous current fluxes and/or ion fluxes.

By means of a conformal deposition, the deposited thickness of electrolyte layer is identical on the horizontal and vertical surfaces. The deposited thickness is therefore the same at all points. By means of conformal deposition of the electrolyte, the minimum distance separating the inner surface of the second electrode 6 and the outer surface of the first electrode 4 is equal to a first distance, at all points of the outer surface of the first electrode, which makes it easier to obtain a homogenous ion flux in the electrolyte.

In a particularly advantageous embodiment, the electrolyte layer and/or the second electrode are deposited in conformal manner so that the thicknesses of material deposited on the top surface and on the lateral surfaces are equal (FIG. 7). What is meant by equal thicknesses is that the difference of thicknesses is less than or equal to 5% of the total deposited thickness.

A conformal deposition of the electrolyte layer enables a good homogenisation of the ion fluxes. A conformal deposition of the second electrode facilitates a good distribution of the potentials over the whole of the interface between the electrolyte layer and the second electrode.

For example, if the first electrode 4 presents a pattern in the form of a slab, the electrolyte layer 5 will also present a slab form, the slab being provided with a non pass-through hole of the shape and size of the first electrode so that the first electrode 4 is embedded in the electrolyte layer 5. The outer surface of the first electrode 4 is in contact with the inner surface of the electrolyte layer 5.

As a variant illustrated in FIG. 4, it may be advantageous to deposit the electrolyte layer 5 in non-conformal manner and/or to structure the electrolyte layer 5 so as to smooth the relief formed by the peripheral guard ring.

The top views represented in FIGS. 5 and 6 can represent devices illustrated in FIGS. 4, 7 and 8 in cross-sectional view.

In these particular cases, if the first electrode 4 is formed on the substrate in the form of a slab, the electrolyte layer 5 is also formed in such a way that the assembly formed by the first electrode and the electrolyte layer 4 is always in the form of a slab and that the lateral surfaces of the first electrode 4 are parallel to the facing lateral surfaces of the electrolyte layer 5. The same is advantageously the case for deposition of the second electrode 6 and also for the second current collector 7.

The initial shape, here a slab, can grow in homothetic manner as the depositions are successively performed, for example the electrolyte layer 5, the second electrode 6 and then the current collector 7.

The thicknesses of the electrolyte layer 5 and of the second electrode 6 can be totally independent from one another.

In an advantageous embodiment, the depositions of the electrolyte layer 5 and of the second electrode 6 are performed in conformal manner so as to have an identical thickness at all points of the electrolyte. The side walls 4c of the first electrode, the outer surface of the electrolyte layer 5 and the outer surface of the second electrode 6 are spaced apart regularly. This makes it possible to obtain a uniform ionic conductivity at the level of the electrolyte, as well as a uniform diffusion kinetics and insertion state at the level of the second electrode.

Preferentially, the second current collector 7 totally covers the second electrode 6.

In the case of a current collector partially covering the second electrode, the non-covered part may not participate in the ion exchanges, which can result in failures. Totally covering of the second electrode by the current collector enables these failures to be prevented and increases the performances and/or the lifespan of the device.

The second current collector 7 and the second electrode 6 are electrically insulated from the first current collector 3 and from the first electrode 4.

The device comprises first and second electric connection means, also called electrically conducting connectors or electric connection elements 9, respectively connected to the first current collector 3 and to the second current collector 7. The first and second electric connection means are insulated from one another. They form electrode contacts.

The first current collector 3 being encapsulated by the electrolyte layer 5 and the second electrode 6, it is not possible to make any current flow as in conventional architectures.

The first current collector 3 comprises electric connection elements 9 electrically connecting the first current collector 3 to a remote contact connection or to a contact connection localised on the second surface of the substrate.

According to a first embodiment, the first and/or second electric connection means can comprise conducting vias passing through the substrate and respectively electrically connecting the first and second current collectors at the level of the second surface of the substrate.

For example, as represented in FIGS. 4 and 7, it is particularly advantageous to provide that the first current collector 3 comprises an electrically conducting connector 9 passing through the substrate to form an electrode contact.

The electrically conducting connector 9 passes through the substrate so as to enable a contact connection on the opposite surface to the surface comprising the first and second electrodes and the electrolyte layer, i.e. from the first surface to the second surface.

In this architecture, the electrode contact is remote which enables a compact electrochemical device having a good cycling resistance to be kept.

In this configuration, it is also advantageous to form the contact connector of the second current collector 7 by another electrically conducting connector 9 which also passes through the substrate, i.e. from the first surface to the second surface. In this way, all the contacts are located on one and the same surface of the substrate. As a variant, the contact of first current collector 3 is on one surface of the substrate and the contact of second current collector 7 is on the opposite surface.

What is meant by passes through is that the electrically conducting connectors 9 go from the first surface of the substrate to the second surface of the substrate. The second surface can comprise any device suitable for collecting the electric charges.

The electrically conducting connectors can be connected by vias. These are connections perpendicular to the first and second surfaces and passing through the substrate.

In the case of a silicon substrate, it is advantageous to arrange an electrically insulating material between the connector 9 and substrate 2 to prevent any short-circuiting.

According to another embodiment, the first and/or second electric connection means can comprise at least one electric connection buried in the substrate with a contact connection on the first surface of the substrate, i.e. on the surface of the substrate comprising the stack.

For example, as illustrated in FIG. 8, the electrically conducting connector 9 is formed by a conducting track which runs inside the substrate, advantageously inside the electrically insulating layer. The conducting track opens onto the first surface to form the contact of the first collector in remote manner. The electric connector 9 runs inside the substrate to open onto the same surface, i.e. the surface which comprises the first and second electrodes.

This configuration enhances protection of the current collector during the technological steps necessary for formation of the stack, such as chemical etching for example. Deposition of the active layers on a substrate not presenting any maskwork in the initial state advantageously avoids having to pass over steps at current collector level.

The first current collector 3 and the electric connector 9 can form one and the same part in this configuration.

According to another embodiment, the second electric connection means comprise at least one electric contact connection of the second current collector, arranged on the substrate, this contact connection being formed by one end of the thin layer forming the collector.

Figure 9:
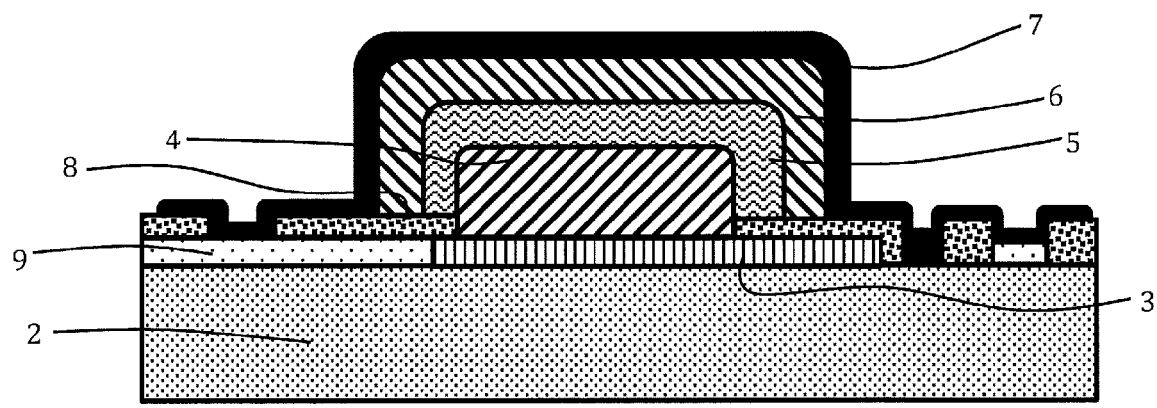

As represented in FIG. 9, a dielectric material layer 8 can be disposed in such a way as to separate the second electrode 6 and the second current collector 7 from the first current collector 3. Advantageously, the dielectric material layer 8 also enables the electrolyte layer 5 to be separated from the first current collector 3.

The person skilled in the art will be able to combine different embodiments with one another.

According to a preferred embodiment, the device 1 is a microbattery. The first electrode 4 corresponds to the negative electrode or to the positive electrode of the battery. The second electrode 6 corresponds to the other electrode. Preferentially, the first electrode 4 is the positive electrode, i.e. the cathode, and the second electrode is the negative electrode, i.e. the anode.

Different microbattery structures can be produced:
  a microbattery called lithium metal microbattery; in this case the anode, corresponding to the second electrode 6, is made from lithium,
  a microbattery of lithium ion type; in this case the anode is a lithium insertion, alloy or conversion material.

Fabrication of a lithium-free battery can also be envisaged. In this case, there is no anode. The second electrode is not deposited before the second current collector 7 which is then deposited directly on the electrolyte 5. The lithium is then electrodeposited directly on the surface of the second current collector 7 in charge mode to form the second electrode 6 and is dissolved in discharge mode.

Preferentially, the device is a lithium-ion microbattery and the second electrode 6 is an anode made from lithium insertion or conversion material, or a lithium alloy.

According to another preferred embodiment, the electrochemical device 1 is an electrochromic system.

The "all-solid" electrochromic system presents itself in the form of a stack of solid thin layers on a substrate 2. In particular, starting from the substrate 2, the electrochromic device successively comprises a counter-electrode 4, an ionic conducting electrolyte 5, and an electrochromic active electrode 6.

The electrochromic active electrode is formed from an electrochromic material able to reversibly and simultaneously insert ions and electrons. Under the effect of a potential difference applied between the active electrode and the counter-electrode, the ions are inserted in the electrochromic material of the active electrode to give a persistent colouring of the corresponding oxidation state. By applying a reverse polarisation, the ions are extracted from the active electrode which reverts to its initial, coloured or transparent, oxidation state.

The oxidation states of the electrochromic material consequently correspond to the inserted and extracted states and are of a different colouring when they are subjected to a suitable electric power supply.

Before application of the potential difference, the displayed colour is that of the substrate, obtained by transmittance through the stack. After application of a potential difference between the active electrode and the counter-electrode, display of a different colour corresponding to that of the electrochromic material of the active electrode is obtained.

The second electrode 6 and/or first electrode 4 is an electrode made from tungsten oxide, iridium oxide, vanadium oxide or molybdenum oxide.

The second electrode 6 is preferentially made from tungsten oxide or from molybdenum oxide.

The solid ionic conducting electrolyte layer is made from a lithium base, for example from lithium nitride ($Li_3N$), LiPON, LiSiPON, or from LiBON etc. . . . .

The specific ion is advantageously the lithium $Li^+$ ion. The $Li^+$ ion presents a greater mobility than other ions such as sodium or silver on account of the small size of the lithium ion, reducing the response time of the electrochromic system.

The counter-electrode, for example the first electrode 4, is for example made from iridium oxide or from vanadium oxide.

The system can also comprise a protective coating made from an acrylic or epoxy resin base.

Advantageously, as the electrochromic active electrode 6 totally covers the electrolyte layer 5, there is no need to deposit an insulating layer on the electrolyte layer 5 in order to protect it.

An external power supply circuit can enable the loads to be counterbalanced and ensure the electroneutrality of the electrochromic display device.

The device is suitable to be used for display of static information, for example for applications in the advertising field.

The electrochromic system presents a greater mobility of the $Li^+$ ions, and the system is reliable and presents good performances. Implementation of this electrochromic system is simple, industrialisable and suitable for large-surface display systems.

The method for producing the electrochemical device 1 comprises the following successive steps:
providing a substrate 2 covered by a first current collector 3,
forming a first electrode 4 on the first current collector 3, the first electrode 4 defining a pattern having a bottom surface, a top surface and side walls, the bottom surface of the pattern covering at least a part of the first current collector 3,
forming an electrolyte layer 5 on the first electrode 4, the electrolyte layer 5 being configured to cover at least the top surface and at least a part of the side walls of the pattern of the first electrode 4,
forming a second electrode 6 totally covering the electrolyte layer 5, the thickness of the electrolyte layer 5 located between the side walls of the pattern of the first electrode 4 and the second electrode 6 being substantially equal around said pattern to within 20%,
forming a second current collector 7 totally covering the second electrode 6, the second current collector 7 and the second electrode 6 being electrically insulated from the first current collector 3 and from the first electrode 4,
forming first and second electric connection means, respectively connected to the first current collector and to the second current collector, and insulated from one another.

More particularly, a microbattery 1 can be fabricated with the method comprising the following successive steps:
providing a substrate 2, for example a silicon substrate,
making the electric connectors 9 (vias) in the substrate, by methods based on formation of an etching mask, etching of the substrate through the etching mask for example by Deep Reactive Ion Etching (DRIE), and deposition of an electrically insulating material and then of an electrically conducting material to fill the etching hole,
forming the first current collector 3:
depositing a Ti/Pt bilayer with a thickness of respectively 20 nm/100 nm,
patterning the bilayer by formation of an etching mask, followed by wet etching, in two successive aqueous solutions "aqua reggia" (for Pt) and $NH_4OH/H_2O_2/H_2O$ (for Ti),
forming the first electrode 4:
depositing a layer of $LiCoO_2$ with a thickness of 10 μm,
patterning said layer, by a formation step of an etching mask, followed by wet etching, in an aqueous solution containing sulphuric acid $H_2SO_4$,
forming the electrolyte layer 5:
depositing a layer of LiPON (standing for Lithium Phosphorus OxyNitride) with a thickness of 1.5 μm,
patterning the LIPON layer by a formation step of an etching mask, followed by wet etching, in an aqueous solution containing hydrogen peroxide $H_2O_2$,
forming the second electrode 6:
depositing a layer of silicon with a thickness of 100 nm,
patterning the silicon layer, by a formation step of an etching mask, followed by wet etching, in an aqueous solution containing KOH,
forming the second current collector 7:
depositing a layer of Cu with a thickness of 1 μm,
patterning said layer, by a formation step of an etching mask, followed by wet etching, in an aqueous solution containing $NH_4OH$.

The depositions of the first current collector 3, of the first electrode 4, of the electrolyte thin layer 5, of the second electrode 6 and of the second current collector 7 are advantageously performed by Physical Vapor Deposition (PVD), and more particularly by cathode sputtering.

The first current collector 3, first electrode 4, electrolyte layer 5, second electrode 6 and second current collector 7 can also be patterned by a photolithography step followed by at least one wet etching step: the method is advantageously easily industrialisable.

The electrochemical device obtained presents an ion flux between the first electrode and the second electrode, at all points of the first electrode.

The active surface of the device is increased.

The architecture of the electrochemical device enables a very uniform ion exchange to be achieved at the level of the two electrodes, which improves the electrochemical properties of the microbattery during cycling operations.

Furthermore, the uniformity of flux considerably reduces, or even eliminates, the mechanical stresses at the level of the first electrode, compared with a conventional structure.

The electrochemical device does not present any morphological degradation (loss of adhesion, interruption of electronic contact, or delamination of the complete stack). The electrochemical performances do not progressively undergo any impairment as cycling operations are performed.

The invention claimed is:

1. An electrochemical device, such as a microbattery or an electrochromic system, comprising a stack of solid thin layers formed on a substrate, said stack successively comprising:
   a first current collector covering a part of the substrate,
   a first electrode defining a pattern having a bottom surface, a top surface and side walls, the bottom surface of the pattern covering at least a part of the first current collector,
   an electrolyte layer configured to cover at least the top surface and at least a part of the side walls of the pattern of the first electrode,
   a second electrode totally covering the electrolyte layer, the thickness of the electrolyte layer does not vary by more than 20% all around the pattern,
   a second current collector totally covering the second electrode, the second current collector and the second electrode being electrically insulated from the first current collector and from the first electrode,
   said device comprising first and second electrically conducting connectors respectively connected to the first current collector and to the second current collector and insulated from one another.

2. The device according to claim 1, wherein the covering of the walls of the first pattern, by the electrolyte layer, is symmetrical all around the pattern.

3. The device according to claim 1, wherein the electrolyte layer and the first current collector totally encapsulate the pattern of the first electrode, the electrolyte layer being in contact with the first current collector and being configured to electrically insulate said first current collector from the second electrode.

4. The device according to claim 1, wherein the first and/or second electrically conducting connectors comprise conducting vias passing through the substrate.

5. The device according to claim 1, wherein the first electrically conducting connectors comprise at least one electric connection buried in the substrate.

6. The device according to claim 1, wherein the second electrically conducting connectors comprise at least one electric contact connection of the second current collector, arranged on the substrate, this contact connection being formed by one end of the thin layer forming the collector.

7. The device according to claim 1, wherein the electrode pattern is a cylinder, a cube or a slab.

8. The device according to claim 1, wherein the device is a lithium-metal microbattery and the second electrode is a lithium anode.

9. The device according to claim 1, wherein the device is a lithium-ion microbattery and the second electrode is an anode made from lithium insertion or conversion material, or a lithium alloy.

10. The device according to claim 1, wherein the device is an electrochromic system and the second electrode and/or the first electrode is an electrode made from tungsten oxide, iridium oxide, vanadium oxide or molybdenum oxide.

11. A fabrication method of an electrochemical device according to claim 1, said method comprising the following successive steps:
    providing a substrate covered by a first current collector,
    forming a first electrode on the first current collector, the first electrode defining a pattern having a bottom surface, a top surface and side walls, the bottom surface of the pattern covering at least a part of the first current collector,
    forming an electrolyte layer on the first electrode, the electrolyte layer being configured to cover at least the top surface and at least a part of the side walls of the pattern of the first electrode,
    forming a second electrode totally covering the electrolyte layer, the thickness of the electrolyte layer does not vary by more than 20% all around the pattern,
    forming a second current collector totally covering the second electrode, the second current collector and second electrode being electrically insulated from the first current collector and from the first electrode,
    forming first and second electrically conducting connectors respectively connected to the first and second current collectors and insulated from one another.

12. The method according to claim 11, wherein the first current collector, the first electrode, the electrolyte layer, the second electrode and second current collector are deposited by physical vapor deposition.

13. The method according to claim 11, wherein the first current collector, the first electrode, the electrolyte layer, the second electrode and second current collector are patterned by a formation step of an etching mask followed by at least one etching step.

* * * * *